US008899846B2

(12) United States Patent
Luo et al.

(10) Patent No.: US 8,899,846 B2
(45) Date of Patent: Dec. 2, 2014

(54) RECEPTACLE DIPLEXER

(75) Inventors: Jian Hong Luo, Ningbo (CN); Yuan Yuan Zhang, Ningbo (CN); Peng Nie, Ningbo (CN)

(73) Assignee: Applied Optoelectronics, Inc., Sugar Land, TX (US)

( * ) Notice: Subject to any disclaimer, the term of this patent is extended or adjusted under 35 U.S.C. 154(b) by 386 days.

(21) Appl. No.: 13/235,976

(22) Filed: Sep. 19, 2011

(65) Prior Publication Data

US 2012/0099870 A1 Apr. 26, 2012

(30) Foreign Application Priority Data

Oct. 21, 2010 (TW) ................................ 99220344 U

(51) Int. Cl.
*G02B 6/36* (2006.01)
*G02B 6/42* (2006.01)
*G02B 6/38* (2006.01)

(52) U.S. Cl.
CPC ............ *G02B 6/4246* (2013.01); *G02B 6/3825* (2013.01); *G02B 6/3897* (2013.01); *G02B 6/4292* (2013.01)
USPC .................. 385/88; 385/53; 385/76

(58) Field of Classification Search
USPC .......................................... 385/53, 76, 88, 89
See application file for complete search history.

(56) References Cited

U.S. PATENT DOCUMENTS

| 7,304,738 B2 * | 12/2007 | Hu ................................ 356/399 |
| 2005/0185898 A1 * | 8/2005 | Stewart ............................ 385/92 |
| 2006/0088252 A1 * | 4/2006 | Althaus et al. .................. 385/88 |

* cited by examiner

*Primary Examiner* — Charlie Peng
*Assistant Examiner* — Mary El Shammaa
(74) *Attorney, Agent, or Firm* — Grossman Tucker Perreault & Pfleger, PLLC; Norman S. Kinsella

(57) ABSTRACT

A pluggable bi-directional optical transceiver may include: a transmitting laser diode, for transmitting an optical signal according to a received electronic signal; an optical sensor, for receiving the optical signal and for generating the electronic signal according to the received optical signal; a fiber adapter, having a ceramic ferrule with two 8-degree end-face corners; a coupling portion, having three different openings for respectively receiving the transmitting laser diode, the optical sensor, and one end of the ceramic ferrule so an optical axis of a transmitting light of the transmitting laser diode is configured to deflect about 3.8 degrees with an optical axis of the ceramic ferrule; and an engaging portion, having a hollow shell for receiving another end of the ceramic ferrule and an engaging piece surrounding outside the shell for pluggably connecting an external fiber piece.

10 Claims, 3 Drawing Sheets

RECEPTACLE DIPLEXER

FIELD OF THE INVENTION

The present invention relates to a pluggable bi-directional optoelectronic transceiver. More particularly, the present invention relates to a receptacle diplexer for signal transmission and transformation used in optoelectronic networks, for example, optical communication, cable TV, etc.

BACKGROUND OF THE INVENTION

The optical fiber communication device has been widely used in high speed communication networks. Especially with the rapid development of the high-speed local area network and fiber optic networks, the demand of optical fiber communication systems increases. In optical fiber communication devices or systems, optoelectronic transceiving modules are installed in communication equipments for optical signal transformation and transmission. In order to increase system design flexibility and easy maintenance, optoelectronic transceiving modules are inserted to the communication device in a pluggable way. The optoelectronic transceiving modules or devices require miniaturization along with the rapid development of optical fiber communication technology, and the performance thereof can not be degraded due to their size getting smaller.

Optoelectronic transceiver is the core component of the optoelectronic transceiving module. Therefore, the miniaturization of optoelectronic transceiving module usually depends on the size of optoelectronic transceiver.

There are known different types of optoelectronic transceivers in traditional optical fiber communications. FIG. 1 shows a conventional optoelectronic transceiver 1A, comprising a transmitting laser diode 1, an optical sensor 2, and a card access/physical connection type (referred to as SC/PC) fiber adapter 3. When optoelectronic transceiver 1A connects with external optical communication device, the connector 4 connects with a fiber 5a. The other end of fiber 5a inserts to an APC (angled physical contact)/APC type fiber adapter 6, and connects to external optical communication system. In such optical transceivers, the light emitted from the laser diode 1 pass through the fiber adapter 3, the fiber 5a, and the fiber adapter 6, therefore, the power loss of the optical signal through above path achieves 0.3 dB to 0.4 dB. In addition, the return reflection loss of the end of the optical adapter 3 is poor. This level of power consumption for high transmission rate such as 2.5 GHz communication applications is not acceptable.

FIG. 2 shows another known fiber bi-directional optoelectronic transceiver, also called pigtail fiber bi-directional optoelectronic transceiver 1B. FIG. 2 shows a pigtail fiber bi-directional optoelectronic transceiver 1B comprising a transmitting laser diode, an optical sensor 10, a ceramic ferrule 11, and a fiber 5c. When optoelectronic transceiver 1B connects with external communication networks, one end of the fiber 5c leading from the body inserts into an APC/APC type fiber adapter 12 and connects to the optical communication networks. The curled fiber 5c, in pluggable bi-directional optoelectronic transceiver 1B, is configured to resolve power reflection loss. However, the radius of the curled fiber 5c has to be more than 15 mm, generally 30 mm. Therefore, the volume of optoelectronic transceiver 1B increases inevitably, and adversely affects the miniaturization of the overall module.

Moreover, in the prior art, in order to resolve the problem of low coupling efficiency of the laser diode, the power of the laser diode will be increased. But this will increase the cost. Or, use 6 degrees or less with the end angle of the ceramic ferrule, but this will cause unstable transmission due to poor return loss. Generally, the ceramic ferrule is made of a hollow ceramic shell and a fiber set in the core of the hollow ceramic shell. The end of the ceramic ferrule is polished at a specified angle, such as 6 degrees.

Therefore, a pluggable bi-directional optoelectronic transceiver with small size, low loss, and low cost is required.

SUMMARY OF THE INVENTION

Taking the aforesaid into consideration, this invention provides a pluggable bi-directional optoelectronic transceiver (such as, a receptacle diplexer) by configuring the ceramic ferrule with an angle and a specified compensation angle being configured between an optical axis of the ceramic ferrule and that of the transmitting laser diode for reducing the size of optical transceivers, the optical return loss, and increasing coupling efficiency.

According to one embodiment of this invention, a pluggable bi-directional optical transceiver is provided, which comprises: a transmitting laser diode, transmitting an optical signal according to a received electronic signal; an optical sensor, receiving the optical signal and generating the electronic signal according to the received optical signal; a fiber adapter, having a ceramic ferrule with two 8-degree end-face corners; a coupling portion, having three different openings for respectively receiving the transmitting laser diode, the optical sensor, and one end of the ceramic ferrule so an optical axis of a transmitting light of the transmitting laser diode is configured to deflect 3.8 degrees with an optical axis of the ceramic ferrule; and an engaging portion, having a hollow shell for receiving another end of the ceramic ferrule and an engaging piece surrounding outside the shell for pluggably connecting an external fiber piece.

According to this invention, the optical transceiver uses the pluggable design, therefore, the winding of the fiber is unnecessary and the volume can be reduced significantly. Moreover, due to the angle of one end-face of the ceramic ferrule connected to an external optical communication networks is 8 degrees, poor return loss can be solved. The other end-face angle of the ceramic ferrule coupled with the laser diode is also 8 degrees, and the optical axis of the transmitting laser diode is configured to deflect 3.8 degrees compensation with an optical axis of the ceramic ferrule. It can significantly improve the coupling efficiency, for example, increasing by 10% to 15%.

The detailed technology and preferred embodiments implemented for the subject invention are described in the following paragraphs accompanying the appended drawings for people skilled in this field to well appreciate the features of the claimed invention.

DETAILED DESCRIPTION OF THE PREFERRED EMBODIMENTS

In the followings, the embodiments of this invention will be illustrated with reference to the drawings. As used herein, the terms "about" and "substantially" refer to within acceptable tolerances known to one of ordinary skill in the art and any numerical ranges or mathematical relationships stated herein are considered to encompass such acceptable tolerances.

Figure 3:
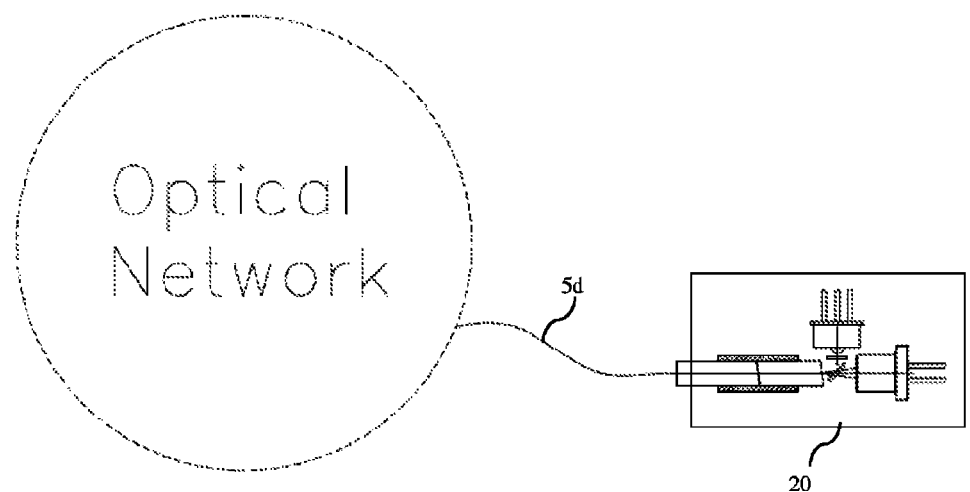
FIG. 3 illustrates the connection of the pluggable bi-directional optoelectronic transceiver and the optical communication networks according to this invention.

FIG. 3 shows the connection of a pluggable bi-directional optoelectronic transceiver 20 of the invention and the optical communication networks.

Figure 1:
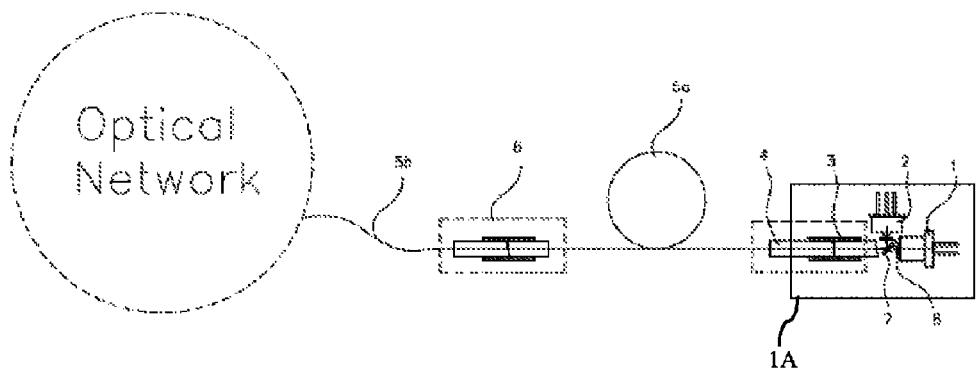
FIG. 1 illustrates the connection of the optoelectronic transceiver and the optical communication networks according to the prior art.
Figure 2:
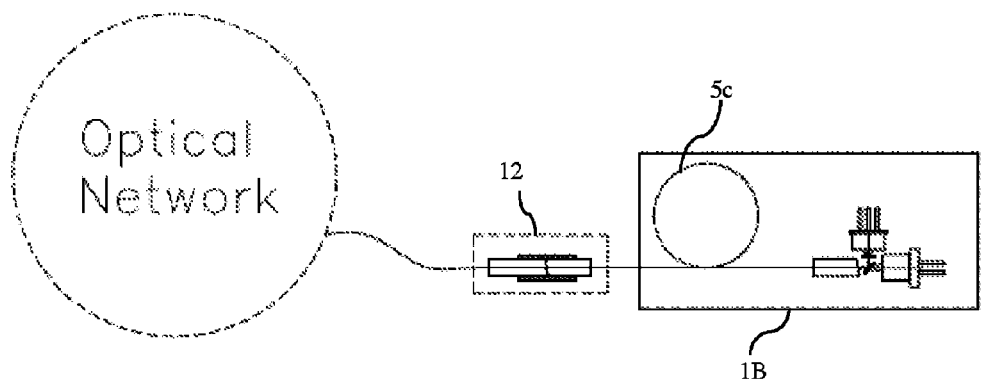
FIG. 2 illustrates another connection of the optoelectronic transceiver and the optical communication networks according to the prior art.

As shown in FIG. 3, the bi-directional optoelectronic transceiver 20 according to this invention, can connect to external optical communication networks via a fiber 5d instead of optical adapter, such as an adapter 6 and 12 in FIGS. 1 and 2.

Figure 4:
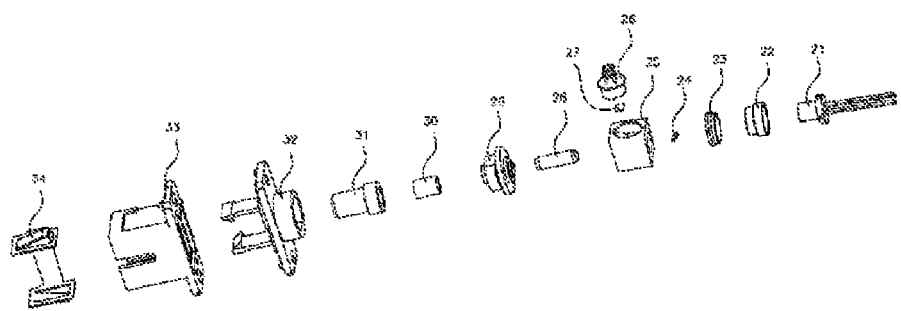
FIG. 4 illustrates the explosion view of the pluggable bi-directional optoelectronic transceiver according to this invention.
Figure 5:
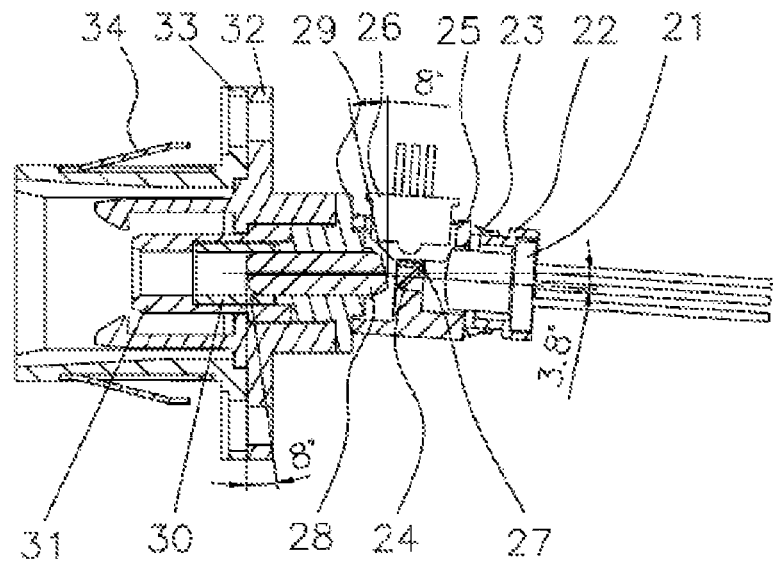
FIG. 5 illustrates the cross-section view of the pluggable bi-directional optoelectronic transceiver according to this invention.

Next, refer to FIGS. 4 and 5, the construction of the pluggable bi-directional optoelectronic transceiver 20 according to this invention will be illustrated.

FIGS. 4 and 5 are the exploded view and section view of the pluggable bi-directional optoelectronic transceiver 20 according to this invention respectively.

As shown in FIG. 4, the optoelectronic transceiver 20 according to this invention comprises a transmitting laser diode 21, an optical sensor 26, a coupling portion, a fiber adapter, and an engaging portion, wherein the coupling portion has a metal base 25, a first filter 24, and a second filter 27. The fiber adapter comprises a ceramic ferrule 28, a metal base 29, a ceramic sleeve 30, and a metal sleeve 31. Further, the engaging portion comprises an upper hook 32, a shell 33 and a clipper 34.

As shown in FIGS. 4 and 5, the transmitting laser diode 21 is fixed to the metal base 25 in the coupling portion through a fixed sleeve 22 and a ring 23. The transmitting laser diode 21 transmits light as signals based on the received electronic signals. For example, the transmitting laser diode 21 is, for example, but not limited to, a distributed feedback laser diode.

The optical sensor 26 is fixed to the coupling portion and receives the optical signals and generates the electronic signals according to the received optical signals. For example, the optical sensor 26 is, for example, but not limited to, an avalanche photo diode.

The coupling portion has a metal base 25, a first filter 24, and a second filter 27. The metal base 25 is three-dimensional and has a hollow shape. The cubic metal base 25 has three-side openings for respectively receiving the transmitting laser diode 21, the optical sensor 26, and fiber adapter so that the light in the coupling portion can follow the predetermined optical path for optical coupling. The normal directions of the two openings of the three-side openings is consistent with each other, the normal direction of the other opening is normal to those of the two openings. In addition, as shown in FIGS. 4 and 5, the first filter 24 is configured to have a 45-degree angle with the optical axis of the transmitting light of the transmitting laser diode 21. The light transmitted from the laser diode 21 passes through the first filter 24, and the light reflected with a specific wavelength received by optical sensor 26. The second filter 27 is configured to be parallel to the optical axis of the transmitting light of the transmitting laser diode 21 and normal to a receiving optical axis of the optical sensor 26. The second filter 27 is used for blocking the light with different wavelengths from specific wavelength received by optical sensor 26.

The fiber adapter comprises a ceramic ferrule 28, a metal fixed base 29, a ceramic sleeve 30, and a metal sleeve 31. As shown in FIG. 5, two end-faces of the ceramic ferrule 28 are polished to have a 8-degree angle so the fiber adapter is an APC/APC type. The one end of the ceramic ferrule 28 is fixed to metal part 25 via the fixed base 29 for coupling with transmitting laser diode 21 and optical sensor 26. The other end of the ceramic ferrule 28 is fixed to the engaging portion via the ceramic sleeve 30 and the metal sleeve 31. Accordingly, the optical signal transmitting from the laser diode 21 and received by the optical sensor 26 can be guided to communicate with external networks.

The engaging portion comprises an upper hook 32, a shell 33 and a clipper 34. As clearly shown in FIGS. 4 and 5, the upper hook 32 can be placed inside the shell 33 via an opening thereof and fixed. The clipper 34 engages with the shell 33. In this manner, the corresponding engaging devices (not shown) of the external optical fiber 5d can be plugged into the shell 33 of the engaging portion and fixed with the clipper 34. Accordingly, the engaging portion can be connected with bi-directional optoelectronic transceiver 20 in a pluggable manner.

It is noted that, according to this invention, the coupling efficiency significantly can be increased by forming specific angles among the axis of the ceramic ferrule 28 (i.e. the axis of the fiber received therein), the optical axis of the transmitting light of the laser diode 21, the optical axis the received light of optical sensor 26. Specifically, the optical axis of the ceramic ferrule 28 is configured to deflect 3.8 degrees with the optical axis of the transmitting light of the transmitting laser diode 21. Moreover, the two end-faces of the ceramic ferrule 28 are 8 degrees.

Figure 6:
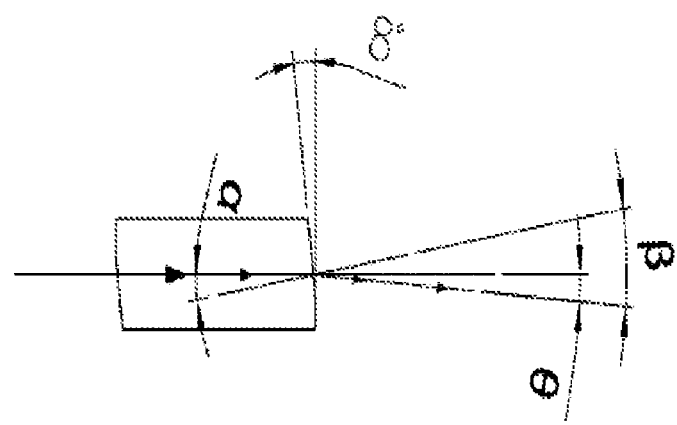
FIG. 6 illustrates the optical path of the angle of the light compensation of the pluggable bi-directional optoelectronic transceiver according to this invention.

FIG. 6 illustrates an optical path to show the angle relationship between the axis of the ceramic ferrule 28 (i.e. the axis of the fiber received therein) and the optical axis of the transmitting light of the laser diode 21 according to the embodiment of this invention.

As shown in FIG. 6, when light enters with an incident angle $\alpha$ ($\alpha=8°$) and emits therefrom with a refraction angle $\beta$, according to the principle of refraction:

$$n_1 \sin \alpha = n_2 \sin \beta$$

wherein $\alpha=8°$, $n_1=1.467$ (the refraction ratio of glass fiber of the ceramic ferrule), $n_2=1$ (the refraction ratio of the air).

According to the above formula, $\theta=\text{arc}(\text{Sin}(n_1 \text{Sin } \alpha)/n_2)-8°=3.78°$ can be obtained.

Therefore, if the optical axis of the transmitting light of the transmitting laser diode is configured to have a 3.8°±0.2° angle with the axis of the ceramic ferrule, the light emission angle and the angle of the light emitted from the laser diode will be consistent. The light received by the optical sensor transmits through the core of ceramic ferrule from external fiber, and then enters into the optical sensor by being reflected with a 45-degree filter (the first filter 24). After the light is reflected by the 8-degree angle of the end-face of the ceramic ferrule, the light will be deflected 3.78 degrees toward the long edge of the 8-degree angle as shown in FIG. 6. Thus, according to this invention, via 3.8-degree compensation deflect angle, the incident angle will be 45 degrees when the emission light reaches the 45-degree filter (the first filter 24).

After being reflected, the light will normally enters the optical sensor to obtain the best coupling efficiency.

Based on the above, the pluggable design is adopted by the optoelectronic transceiver of this invention, the curled fiber is unnecessary, the volume can be decreased significantly. Further, the end face of the ceramic ferrule connecting with external networks is 8 degrees, the problem of poor return loss can be solved accordingly. The other end face of the ceramic ferrule connecting with laser diode is also 8 degrees and the optical axis is configured to 3.8 degrees deflect compensation with the optical axis of transmitting light from transmitting laser diode. Thus, the coupling efficiency can be increased significantly, for example, 10% to 15%.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A pluggable bi-directional optoelectronic diplexer transceiver, comprising:
    a transmitting laser diode, for transmitting an optical signal according to a received electronic signal;
    an optical sensor, for receiving the optical signal and for generating the electronic signal according to the received optical signal;
    a fiber adapter, having a ceramic ferrule with two end faces and a single optical axis, wherein at least a portion of each of the two end faces has an angle of about 8 degrees relative to a line perpendicular to the optical axis;
    a coupling portion for optically coupling both the transmitting laser diode and the optical sensor to the single optical axis of the ceramic ferrule in the fiber adapter, the coupling portion having three different openings for respectively receiving the transmitting laser diode, the optical sensor, and one end of the ceramic ferrule so an optical axis of a transmitting light of the transmitting laser diode is configured to deflect about 3.8 degrees with the optical axis of the ceramic ferrule; and
    an engaging portion, having a hollow shell for receiving another end of the ceramic ferrule and an engaging piece surrounding outside the shell for pluggably connecting an external fiber piece.

2. The pluggable bi-directional optoelectronic diplexer transceiver as claimed in claim 1, wherein the transmitting laser diode is plugged into a fixed sleeve, the fixed sleeve is fixed to one side of the coupling portion, and the end of the ceramic ferrule is plugged into a fixed base, the fixed base is fixed to another side of the coupling portion, the another side is opposite to the one side of the coupling potion fixed to the fixed sleeve.

3. The pluggable bi-directional optoelectronic diplexer transceiver as claimed in claim 1, wherein the transmitting laser diode is a distributed feedback laser diode.

4. The pluggable bi-directional optoelectronic diplexer transceiver as claimed in claim 1, wherein the optical sensor is an avalanche photo diode.

5. The pluggable bi-directional optoelectronic diplexer transceiver as claimed in claim 1, wherein the coupling portion has a hollow metal cubic base with three-side openings, a first filter, and a second filter, the normal direction of the two openings of the three-side openings is consistent with each other, the normal direction of the other opening is substantially normal to those of the two openings, the first filter is configured to have about a 45-degree angle with the optical axis of the transmitting light of the transmitting laser diode, the second filter is configured to be substantially parallel to the optical axis of the transmitting light of the transmitting laser diode and substantially normal to a receiving optical axis of the optical sensor.

6. A pluggable bi-directional optoelectronic diplexer transceiver, comprising:
    a transmitting laser diode for transmitting an optical signal according to a received electronic signal;
    an optical sensor for receiving the optical signal and for generating the electronic signal according to the received optical signal;
    a fiber adapter having at least one end face and a single optical axis, wherein at least a portion of the at least one end face has an angle of about 8 degrees relative to a line perpendicular to the optical axis;
    a coupling portion for optically coupling both the transmitting laser diode and the optical sensor to the single optical axis of the fiber adapter, the coupling portion having at least three different openings for respectively receiving the transmitting laser diode, the optical sensor, and one end of the fiber adapter so an optical axis of a transmitting light of the transmitting laser diode is configured to deflect about 3.8 degrees with the optical axis of the fiber adapter; and
    an engaging portion having a hollow shell for receiving another end of the fiber adapter and an engaging piece surrounding outside the shell for pluggably connecting an external fiber piece.

7. The pluggable bi-directional optoelectronic diplexer transceiver as claimed in claim 6, further comprising:
    a first filter configured to have about a 45-degree angle with the optical axis of the transmitting light of the transmitting laser diode; and
    a second filter configured to be substantially parallel to the optical axis of the transmitting light of the transmitting laser diode and substantially normal to a receiving optical axis of the optical sensor.

8. The pluggable bi-directional optoelectronic diplexer transceiver as claimed in claim 6, wherein the fiber adapter includes a ceramic ferrule having the at least on end-face of about 8 degrees.

9. The pluggable bi-directional optoelectronic diplexer transceiver as claimed in claim 8, wherein the ceramic ferrule has two end-faces of about 8 degrees.

10. The pluggable bi-directional optoelectronic diplexer transceiver as claimed in claim 6, further comprising:
    a fixed sleeve, wherein the transmitting laser diode is plugged into the fixed sleeve and the fixed sleeve is fixed to one side of the coupling portion; and
    a fixed base, wherein the end of the ceramic ferrule is plugged into the fixed base and the fixed base is fixed to another side of the coupling portion opposite to the one side of the coupling potion fixed to the fixed sleeve.

* * * * *